(12) United States Patent
Endo et al.

(10) Patent No.: US 11,485,025 B2
(45) Date of Patent: Nov. 1, 2022

(54) HAND MECHANISM (71) Applicant: THK CO., LTD., Tokyo (JP)

(72) Inventors: Yoshimasa Endo, Tokyo (JP); Kenji Hidaka, Tokyo (JP)

(73) Assignee: THK CO., LTD., Tokyo (JP)

( * ) Notice: Subject to any disclaimer, the term of this patent is extended or adjusted under 35 U.S.C. 154(b) by 137 days.

(21) Appl. No.: 16/754,417

(22) PCT Filed: Sep. 21, 2018

(86) PCT No.: PCT/JP2018/035078
§ 371 (c)(1),
(2) Date: Apr. 8, 2020

(87) PCT Pub. No.: WO2019/087613
PCT Pub. Date: May 9, 2019

(65) Prior Publication Data
US 2020/0391390 A1 Dec. 17, 2020

(30) Foreign Application Priority Data
Nov. 1, 2017 (JP) .............................. JP2017-211675

(51) Int. Cl.
B25J 15/00 (2006.01)
B25J 9/10 (2006.01)
B25J 9/00 (2006.01)

(52) U.S. Cl.
CPC ........... B25J 15/0009 (2013.01); B25J 9/104 (2013.01); *B25J 9/0009* (2013.01)

(58) Field of Classification Search
CPC ....... B25D 2250/041; B29C 2045/1786; B25J 9/0009; B25J 9/104; B25J 15/0009;
(Continued)

(56) References Cited

U.S. PATENT DOCUMENTS 6,247,738 B1 6/2001 Winkel et al.
8,276,958 B2 * 10/2012 Ihrke .................. B25J 9/1075
74/490.06

(Continued)

FOREIGN PATENT DOCUMENTS

CN 203707720 U 7/2014
JP 5505138 B2 5/2014
JP 2014172116 A * 9/2014

OTHER PUBLICATIONS

International Search Report dated Oct. 23, 2018, issued in counterpart International Application No. PCT/JP2018/035078 (2 pages).
(Continued)

*Primary Examiner* — Dean J Kramer
(74) *Attorney, Agent, or Firm* — WHDA, LLP (57) ABSTRACT In order to extend a life span of a flexible cable passing through a movable portion, provided is a hand mechanism which has a plurality of fingers and grips an object with the fingers, including: a flexible cable; a joint which flexes or extends with the grip of the object, has a path for the flexible cable, and has a first surface and a second surface that is a surface bending from the first surface at a bending portion in the path; and a sheet which is provided between the first surface and the flexible cable to have flexibility and is formed such that a gap is provided between the second surface and the sheet.

4 Claims, 7 Drawing Sheets

(58) Field of Classification Search
CPC .... B25J 15/0029; B25J 15/0233; B25J 15/10; H01R 13/562; H01R 13/565; H02G 15/1806; B66C 1/122
USPC .................................................. 294/106, 111
See application file for complete search history.

(56) References Cited

U.S. PATENT DOCUMENTS

| | | | |
|---|---|---|---|
| 2010/0010670 A1* | 1/2010 | Matsukuma | B25J 9/1612 700/245 |
| 2012/0004774 A1 | 1/2012 | Umetsu | |
| 2014/0051279 A1* | 2/2014 | Lee | H01R 13/5841 439/449 |
| 2014/0103673 A1* | 4/2014 | Nammoto | B25J 13/082 294/106 |
| 2015/0144375 A1* | 5/2015 | Hashimoto | H01B 3/441 174/113 R |
| 2019/0375114 A1* | 12/2019 | Williams | B25J 15/10 |

OTHER PUBLICATIONS

Office Action dated Aug. 11, 2022 issued in counterpart CN application No. 201880070949.5 with English translation. (13 pages).

\* cited by examiner

RADIUS OF CURVATURE

HAND MECHANISM

TECHNICAL FIELD

The present invention relates to a hand mechanism.

BACKGROUND ART

A hand mechanism that is attached to a robot arm or the like and grips an object with a plurality of fingers has been developed. For example, PTL 1 discloses a robot device including a hand mechanism having a plurality of fingers (a multi-fingered hand portion), and a robot arm having the hand mechanism attached to its tip.

CITATION LIST

Patent Literature

[PTL 1] Japanese Patent No. 5505138

SUMMARY OF INVENTION

Technical Problem

In a hand mechanism, a pressure sensor may be provided at a tip of a finger. A flexible cable is connected to the pressure sensor in order to input output signals of the pressure sensor to a control device. A path for this flexible cable is provided inside the finger. The finger is provided with a joint that flexes or extends when gripping an object, and the flexible cable passes through the joint.

When the joint repeatedly flexes or extends with the grip of the object, the flexible cable also repeatedly bends or extends in accordance with the operation. Here, when there is an edge in the joint and the flexible cable comes into contact with and rubs against the edge when the flexible cable bends or extends, there is concern that the flexible cable may be worn. Further, when the flexible cable repeatedly bends or extends along the edge, there is concern that fatigue failure may occur in the flexible cable. In this way, when a life span of the flexible cable is shortened, a user is forced to replace the flexible cable. Also, the same may occur when a finger or an arm portion is provided with other sensors, motors, and the like, and flexible cables connected to them pass through a joint.

The present invention has been made in view of the various circumstances described above, and an object of the present invention is to extend a life span of a flexible cable passing through a movable portion.

Solution to Problem

One aspect of the present invention is a hand mechanism which has a plurality of fingers and grips an object with the fingers, the hand mechanism including: a flexible cable; a joint which flexes or extends with the grip of the object, has a path for the flexible cable, and has a first surface and a second surface that is a surface bending from the first surface at a bending portion in the path; and a sheet which is provided between the first surface and the flexible cable to have flexibility and is formed such that a gap is provided between the second surface and the sheet.

Advantageous Effects of Invention

According to the present invention, a life span of a flexible cable which passes through a movable portion can be extended.

DESCRIPTION OF EMBODIMENTS

An embodiment for carrying out the present invention will be described below with reference to the drawings. However, dimensions, materials, shapes, relative arrangements, and the like of components described in the present embodiment are not intended to limit the scope of the present invention only thereto unless otherwise specified.

According to the hand mechanism of the present invention, since the sheet is provided on the edge, direct contact of the flexible cable with the edge can be inhibited. In addition, since the sheet is formed such that the gap is provided between the second surface and the sheet and is not bent along the edge, excessive decrease in radius of curvature of the flexible cable can be inhibited. Further, since the sheet has flexibility, it can be deformed in accordance with flexion and extension of the joint, and thus disturbance of the movement of the flexible cable can be inhibited. As a result, occurrence of wear and fatigue failure of the flexible cable caused by the edge can be inhibited.

Embodiment

Figure 1:
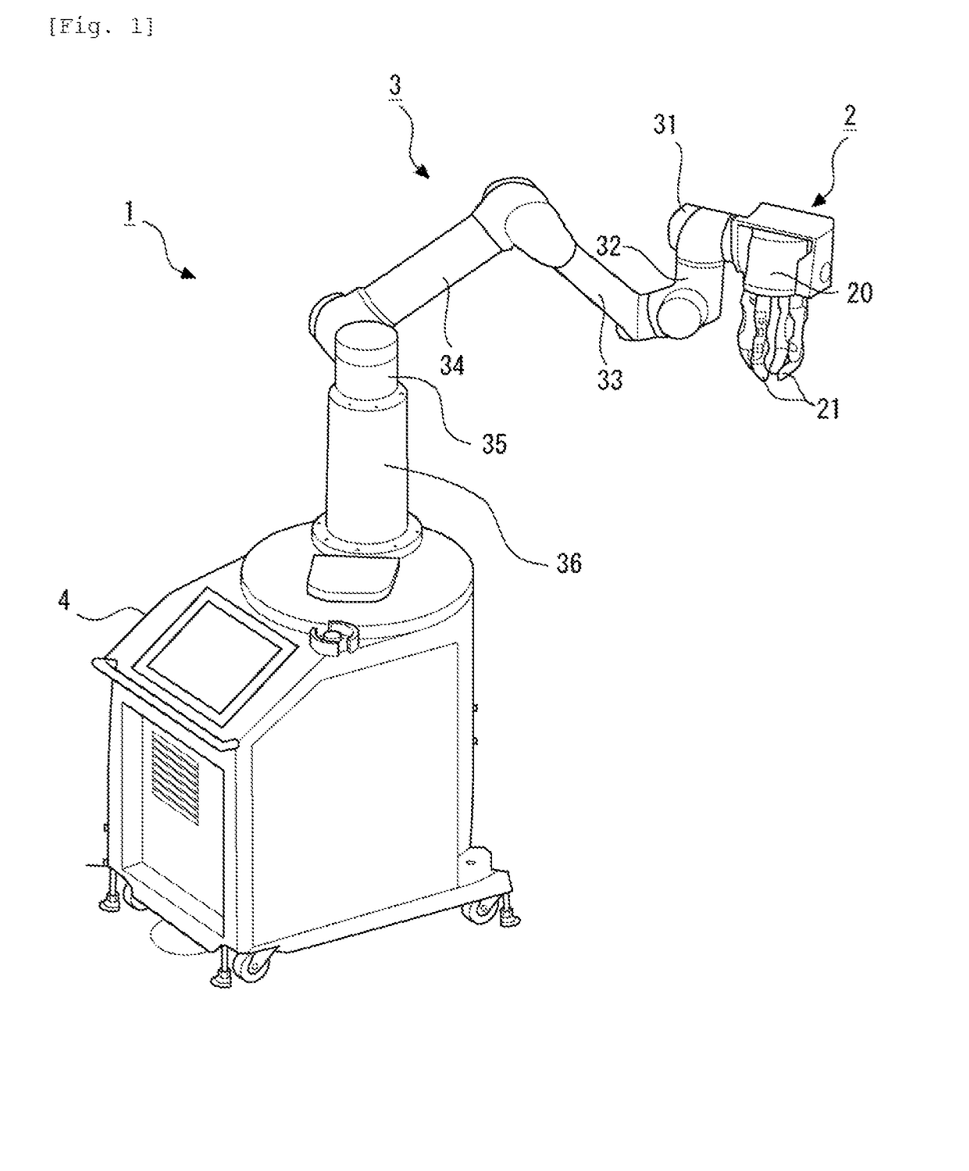
FIG. 1 is a diagram showing a schematic configuration of a robot arm according to an embodiment.

Here, a case in which a hand mechanism according to the present invention is applied to a robot arm will be described. FIG. 1 is a diagram showing a schematic configuration of the robot arm according to the present embodiment. The robot arm 1 includes a hand mechanism 2, an arm mechanism 3, and a pedestal 4. The hand mechanism 2 is attached to one end of the arm mechanism 3. Also, the other end of the arm mechanism 3 is attached to the pedestal 4. The hand mechanism 2 includes a base 20 connected to the arm mechanism 3 and a plurality of fingers 21 (four fingers 21 in the example shown in FIG. 1) movably supported by the base 20.

<Hand Mechanism>

Figure 2:
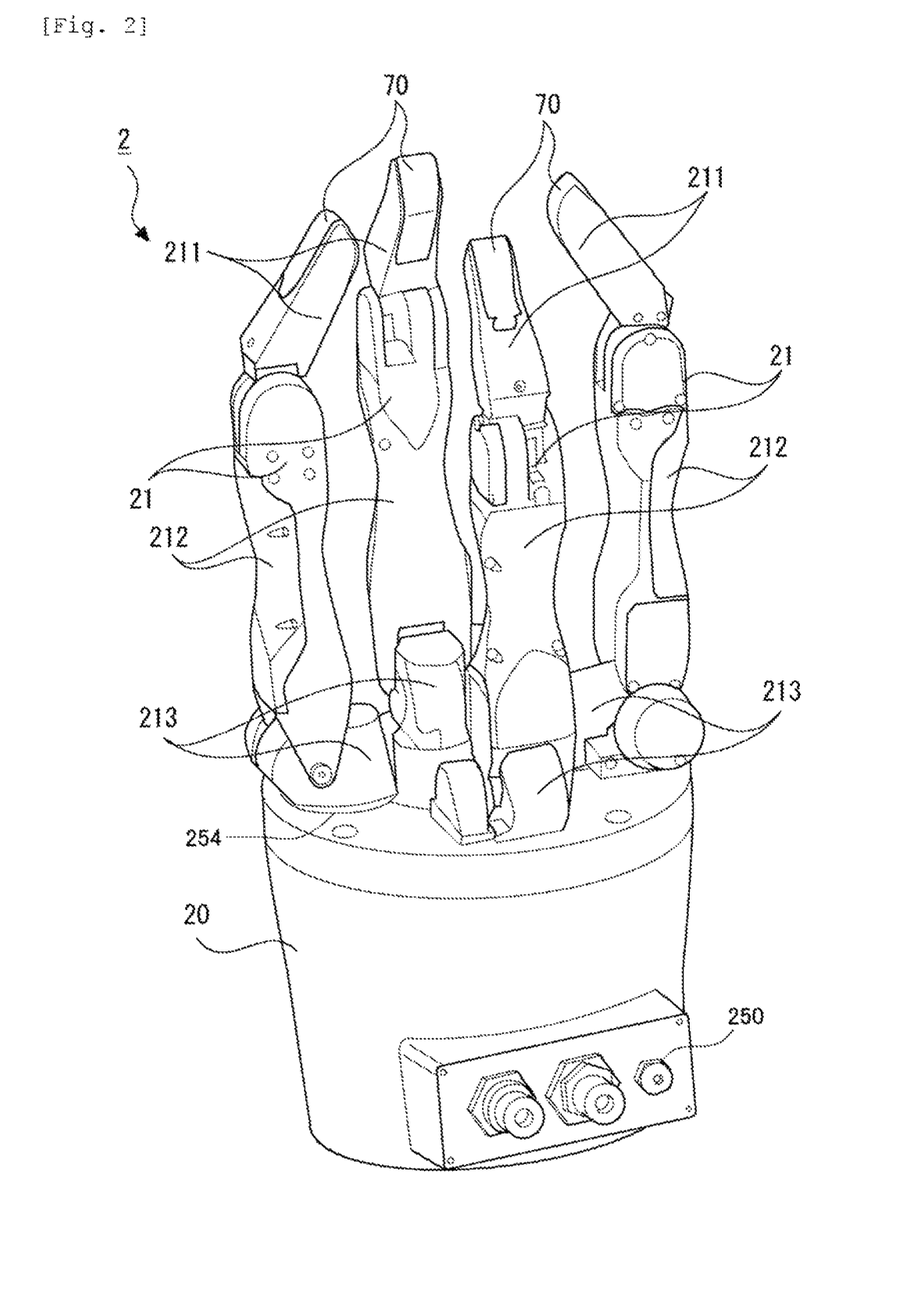
FIG. 2 is a perspective view of a hand mechanism according to the embodiment.
Figure 3:
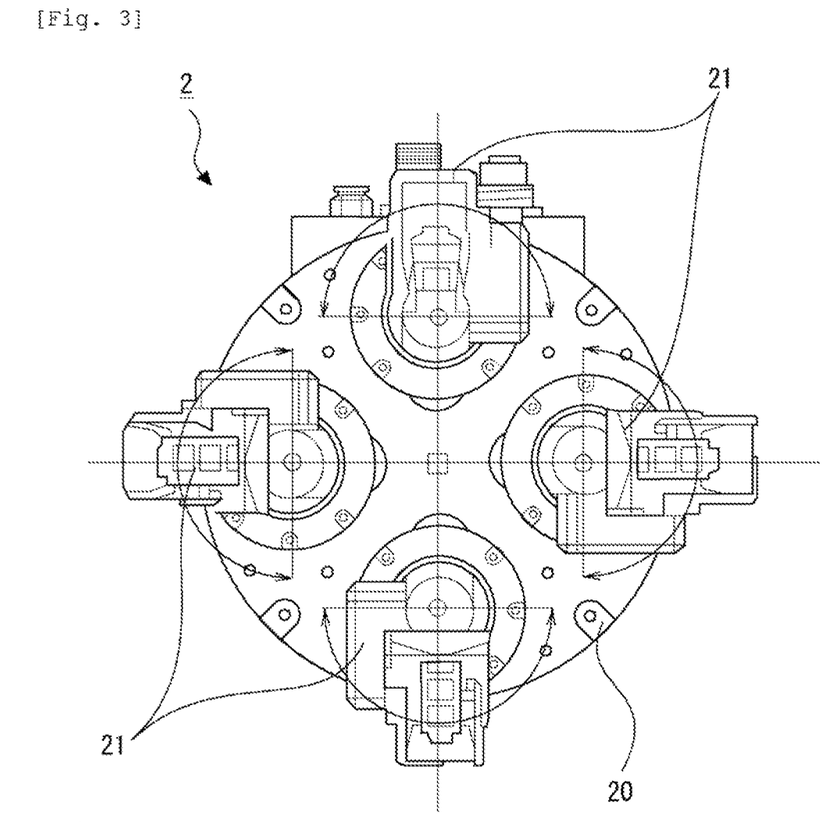
FIG. 3 is a top view of the hand mechanism according to the embodiment.

Next, a configuration of the hand mechanism 2 will be described with reference to FIGS. 2 to 8. FIG. 2 is a perspective view of the hand mechanism 2. FIG. 3 is a top view of the hand mechanism 2. Also, in FIG. 3, arrows indicate rotatable ranges of the respective fingers 21. As shown in FIGS. 2 and 3, in the hand mechanism 2, the four fingers 21 are disposed on the base 20 at equal angular intervals (that is, 90-degree intervals) on a circumference centered on an axis of the hand mechanism 2 in a longitudinal direction (a direction perpendicular to the paper surface in FIG. 3). The four fingers 21 have the same structure and the same length. However, an operation of each finger 21 is independently controlled.

Figure 4:
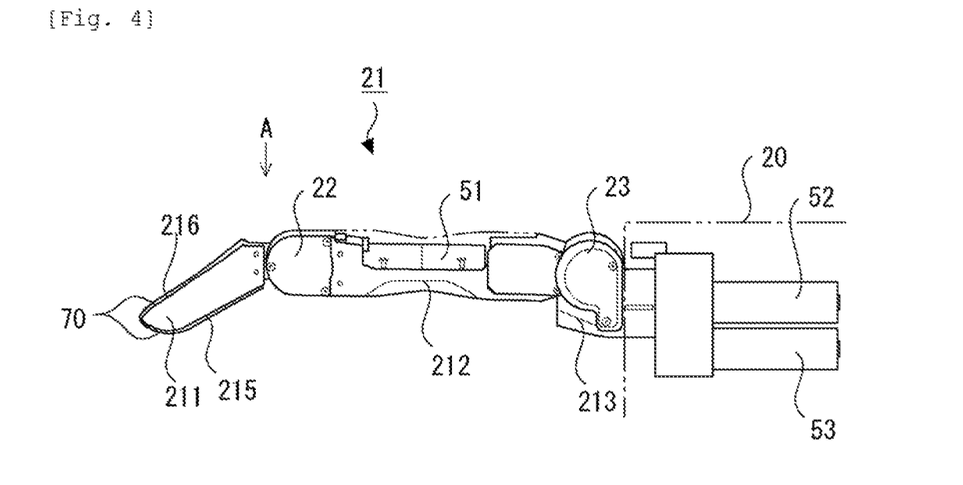
FIG. 4 is a side view of a finger of the hand mechanism according to the embodiment.
Figure 5:
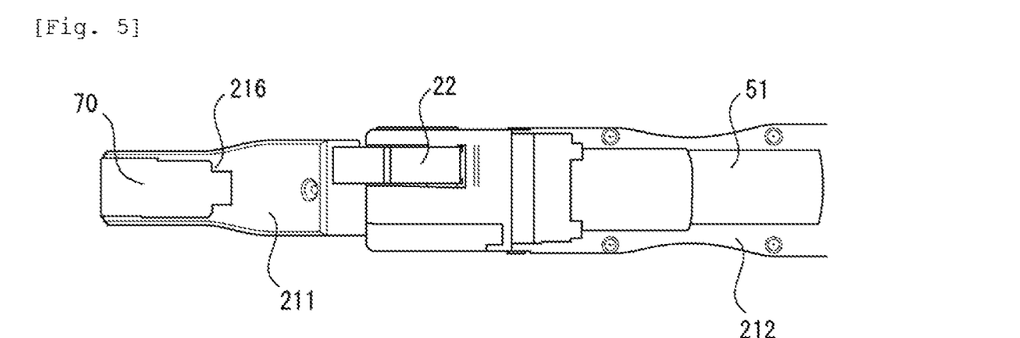
FIG. 5 is a diagram of a tip side of the finger of the hand mechanism according to the embodiment viewed from a direction of arrow A in FIG. 4.

FIGS. 4 to 8 are diagrams for illustrating a configuration of the finger 21 of the hand mechanism 2 and its driving mechanism. FIG. 4 is a side view of the finger 21. Also, FIG. 4 shows the base 20 in a transparent state, and FIG. 4 also shows an internal structure of a part of the finger 21 located inside the base 20. Further, FIG. 5 is a diagram showing a tip side of the finger 21 from a direction of arrow A in FIG. 4. Also, in FIGS. 4 and 5, a part of a second finger link 212 of the finger 21, which will be described later, is described in a transparent state, and an internal structure of the second finger link 212 is also shown.

As shown in FIGS. 2 and 4, each finger 21 has a first finger link 211, a second finger link 212, and a base end 213. In addition, the base end 213 of the finger 21 is connected to the base 20. Here, the base end 213 is connected to the base 20 to be rotatable around the axis of the finger 21 in the longitudinal direction (direction perpendicular to the paper surface in FIG. 3), as indicated by the arrow in FIG. 3. Also, in the finger 21, one end of the second finger link 212 is connected to the base end 213. In addition, a second joint 23 is formed at a connection portion between the second finger link 212 and the base end 213. Further, as shown in FIGS. 4 and 5, in the finger 21, one end of the first finger link 211 is connected to the other end of the second finger link 212. In addition, a first joint 22 is formed at a connection portion between the first finger link 211 and the second finger link 212.

Figure 6:
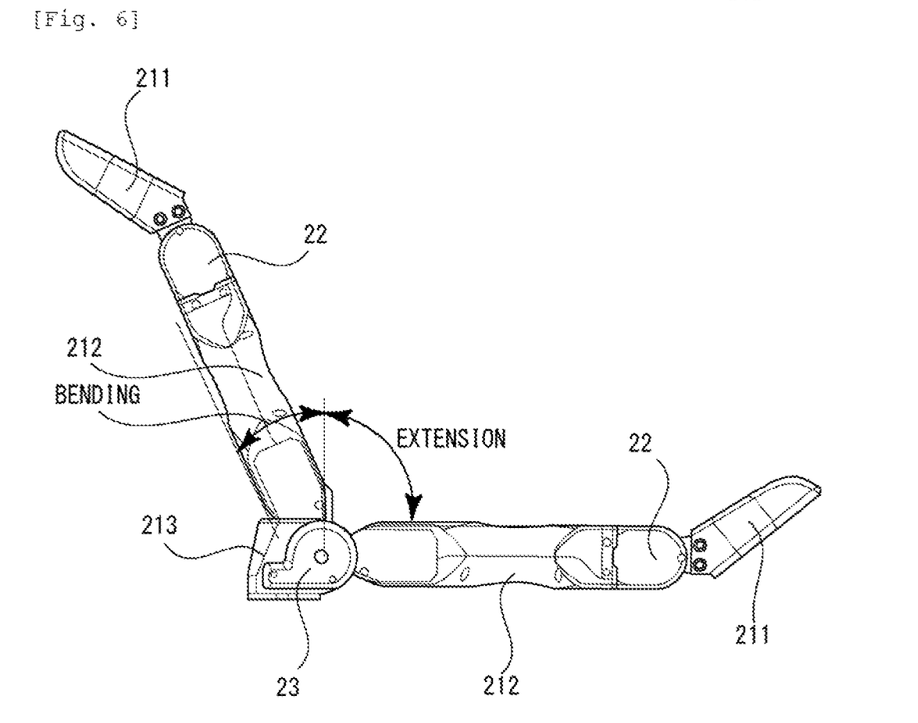
FIG. 6 is a diagram showing a movable range of a second joint in the finger of the hand mechanism according to the embodiment.

Further, as shown in FIG. 4, a second motor 52 and a third motor 53 are provided inside the base 20. The third motor 53 is a motor for driving the base end 213 to rotate around its axis. By transmitting a torque of the third motor 53 to a rotation shaft of the base end 213 via a gear, the base end 213 is driven to rotate, and thus, with this rotation, the entire finger 21 is driven to rotate within a range indicated by the arrow in FIG. 3. Also, the second motor 52 is a motor for driving the second finger link 212 to rotate relative to the base end 213 in the second joint 23. A rotation force of the second motor 52 is transmitted to a rotation shaft of the second finger link 212. As a result, the second finger link 212 is driven to rotate relative to the base end 213 within a range indicated by arrows in FIG. 6. As shown in FIG. 6, the second joint 23 is formed to be able to flex and extend. Also, a driving force of the second motor 52 and a driving force of the third motor 53 are configured to be independently transmitted to an operation target.

Figure 7:
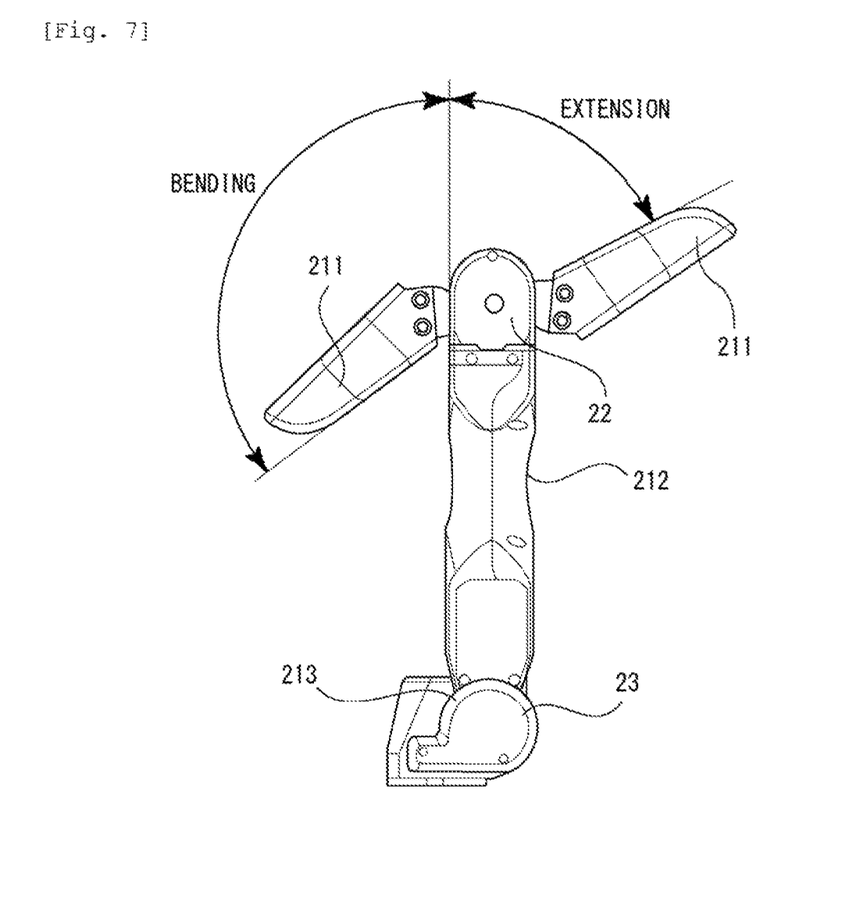
FIG. 7 is a diagram showing a movable range of a first joint in the finger of the hand mechanism according to the embodiment.

Further, as shown in FIGS. 4 and 5, the first motor 51 is provided inside the second finger link 212. The first motor 51 is a motor for driving the first finger link 211 to rotate relative to the second finger link 212 in the first joint 22. A torque of the first motor 51 is transmitted to a rotation shaft of the first finger link 211 via a gear. As a result, the first finger link 211 is driven to rotate relative to the second finger link 212 within a range indicated by arrows in FIG. 7. As shown in FIG. 7, the first joint 22 is formed to be able to flex and extend.

Figure 8:
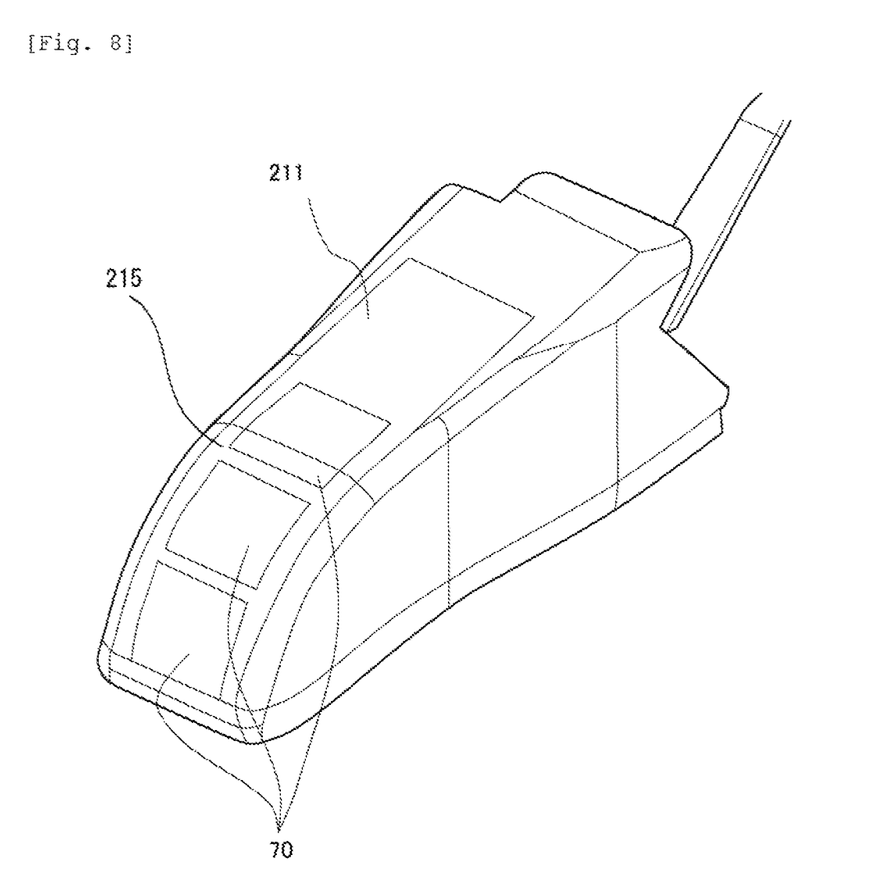
FIG. 8 is a diagram showing an arrangement of pressure sensors on a tip side of a first finger link of the finger of the hand mechanism according to the embodiment.

Further, as shown in FIGS. 2, 4, 5, and 8, in the present embodiment, pressure sensors 70 are provided on a tip side of the first finger link 211 of the finger 21. The pressure sensors 70 are sensors that detect an external force (pressure) acting on the tip of the first finger link 211. Also, as shown in FIG. 4, the pressure sensors 70 are provided on both surfaces of a wall surface 215 on a flexion direction side (hereinafter, also referred to as "flexion side wall surface") and a wall surface 216 on an extension direction side (hereinafter, also referred to as "extension side wall surface") of the first joint 22 in the first finger link 211. Here, in the present embodiment, the flexion side wall surface 215 on the tip side of the first finger link 211 is formed in a curved surface shape. Therefore, as shown in FIG. 8, the plurality of pressure sensors 70 may be arranged on the flexion side wall surface 215 on the tip side of the first finger link 211 along the curved surface shape.

<Arm Mechanism>

The arm mechanism 3 includes a first arm link 31, a second arm link 32, a third arm link 33, a fourth arm link 34, a fifth arm link 35, and a connection member 36. A motor (not shown) for rotating each arm link around its axis is provided in each arm link. With such a configuration of the arm mechanism 3, for example, the arm mechanism 3 can be a mechanism having six degrees of freedom.

<Pedestal>

A control device (not shown) for controlling the hand mechanism 2 and the arm mechanism 3 is built in the pedestal 4. The control device includes a plurality of drivers that generate a drive signal for driving each motor provided in the hand mechanism 2 and the arm mechanism 3, and the control device is configured to supply the drive signal from each driver to each corresponding motor. Further, signals from the pressure sensors 70 are input to the control device. The control device includes a computer having an operation processing unit and a memory. Also, the control device stores predetermined control programs and controls the hand mechanism 2 and the arm mechanism 3 by executing the programs.

<Joint>

Figure 9:
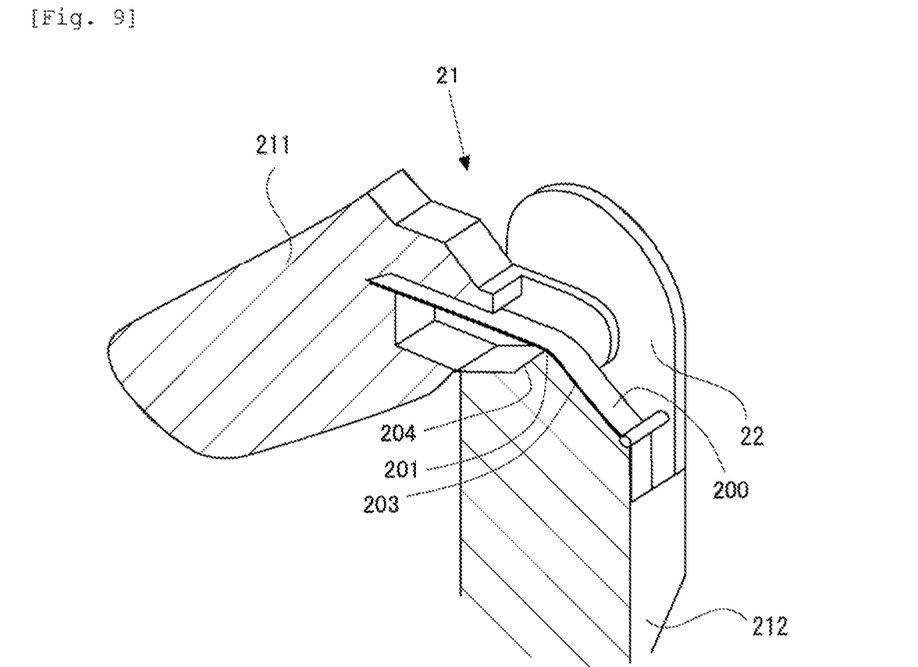
FIG. 9 is a diagram showing a schematic configuration of the first joint of the finger according to the embodiment.

FIG. 9 is a diagram showing a schematic configuration of the first joint 22 of the finger 21. Some mechanisms are not shown in FIG. 9. As shown in FIG. 7, the pressure sensors 70 are provided on the tip side of the first finger link 211 of the finger 21, and the pressure sensors 70 are connected to the control device via the flexible cable 200. The flexible cable 200 is an electric wire in which flat conductors are arranged in parallel and that is entirely covered with an insulator, and has flexibility. For example, copper can be used for the flat conductor. Also, for the insulator, for example, polyimide or polyester can be used.

Since the flexible cable 200 is wired from the first finger link 211 to the pedestal 4, there is also a path of the flexible cable 200 inside the first joint 22. At the time of flexion and extension of the first joint 22, the flexible cable 200 is deformed in accordance with its movement, and thus disconnection of the flexible cable 200 is inhibited and electrical connection is maintained.

However, when the first joint 22 flexes or extends, the flexible cable 200 may come into contact with an edge 201 formed on the first joint 22. Here, the edge 201 is a portion which is bent in a convex shape on a surface of a member forming the first joint 22. The edge 201 shown in FIG. 9 is positioned at a location with which the flexible cable 200 may come into contact when the first joint 22 flexes. The edge 201 is formed by an intersection of two surfaces (a first surface 203 and a second surface 204). Therefore, the second surface 204 is a surface bent from the first surface 203 at the edge 201 (a bending portion). That is, in the present example, the edge 201 corresponds to the bending portion in the present invention.

When the first joint 22 is configured such that the flexible cable 200 comes into contact with the edge 201 every time the first joint 22 repeatedly flexes, the edge 201 wears the flexible cable 200. Also, when the flexible cable 200 is bent by the edge 201 (bending portion), fatigue failure may be caused. Further, the bending portion may include a chamfered portion and a portion having a curved surface. For example, by forming the bending portion with a curved surface and increasing a radius of curvature thereof, occurrence of wear and fatigue failure can be inhibited to some extent, but wear and fatigue may progress while the first joint 22 repeatedly flexes.

Figure 10:
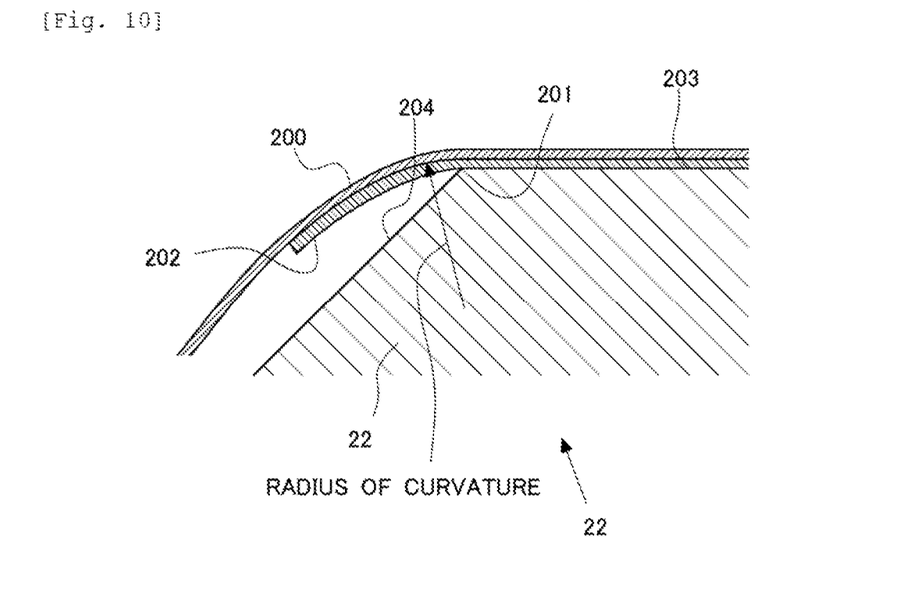
FIG. 10 is a diagram showing a state of a protective sheet near an edge.

Therefore, in the present embodiment, a protective sheet 202 which is a flexible sheet-shaped member is provided between the flexible cable 200 and the edge 201. FIG. 10 is a diagram showing a state of the protective sheet 202 near the edge 201. In addition, the first surface 203 and the second surface 204 are surfaces of a member constituting the first joint 22. The protective sheet 202 is bonded to the flexible cable 200 using, for example, an adhesive. Further, the protective sheet 202 is sandwiched between the flexible cable 200 and the edge 201 on the first surface 203, and the first surface 203 and the protective sheet 202 are fixed by, for example, an adhesive. Therefore, the flexible cable 200 is disposed along the first surface 203 with the protective sheet 202 sandwiched between the flexible cable 200 and the first surface 203.

On the other hand, the protective sheet 202 is not bonded to the second surface 204. For that reason, the protective sheet 202 protrudes from the first surface 203 to a space above the second surface 204 without bending at the edge 201 in FIG. 10. That is, the protective sheet 202 protrudes from the edge 201 in a surface direction of the first surface 203. Since the protective sheet 202 has flexibility, it is flexible in the space above the second surface 204. In this way, even when the protective sheet 202 is bent, the protective sheet 202 is formed such that a gap is provided between the second surface 204 and the protective sheet 202. Also, a material and a shape of the protective sheet 202 are determined such that the protective sheet 202 can bend toward the second surface 204 so as not to come into contact with the second surface 204.

By disposing the protective sheet 202 in this manner, contact of the flexible cable 200 with the edge 201 is inhibited. Therefore, the flexible cable 200 can be inhibited from being rubbed and worn by the edge 201 when the first joint 22 flexes.

Further, when the first joint 22 flexes, the flexible cable 200 bends integrally with the protective sheet 202, and thus the flexible cable 200 does not easily bend as compared to the case in which the flexible cable 200 bends alone. That is, when the flexible cable 200 is directly wired on the edge 201, the flexible cable 200 bends on the edge 201 and the radius of curvature of the flexible cable 200 on the edge 201 at this time becomes relatively small. On the other hand, when the flexible cable 200 wired on the protective sheet 202 bends, the radius of curvature that is minimum around the edge 201 (see FIG. 10) relatively increases. Therefore, even when the flexible cable 200 repeatedly bends when the first joint 22 repeatedly flexes, the radius of curvature at that time is relatively larger, and thus fatigue failure does not easily occur.

An upper limit of a protruding length of the protective sheet 202 that protrudes from the edge 201 above the second surface 204 is determined such that the flexible cable 200 does not come into contact with other members. If the protective sheet 202 is too long, the flexible cable 200 will not easily bend. Accordingly, when the first joint 22 flexes, the flexible cable 200 may come into contact with other members without being bent sufficiently. Therefore, the length of the protective sheet 202 is determined to inhibit its contact with other members.

Also, a lower limit of the protruding length of the protective sheet 202 that protrudes from the edge 201 above the second surface 204 is determined such that wear and fatigue strength of the flexible cable 200 are within an allowable range. For example, if the protective sheet 202 is too short, the protective sheet 202 does not sufficiently bend when the first joint 22 flexes, and thus the flexible cable 200 is easily bent at an end of the protective sheet 202. In this case, fatigue failure of the flexible cable 200 easily occurs at the end of the protective sheet 202. The length of the protective sheet 202 is set to inhibit such fatigue failure.

In consideration of the above, the protruding length of the protective sheet 202 that protrudes from the edge 201 above the second surface 204 is obtained in advance by an experiment or a simulation. Further, by making a width of the protective sheet 202 equal to or larger than a width of the flexible cable 200, direct contact of the flexible cable 200 with the edge 201 is inhibited.

Further, the material of the protective sheet 202 may be selected such that the flexible cable 200 is inhibited from being worn by the protective sheet 202 itself. In this case, if a hardness of the protective sheet 202 is set to be equal to or less than a hardness of the flexible cable 200, wear of the flexible cable 200 can be inhibited. In addition, from the viewpoint of inhibiting the protective sheet 202 from being worn by the edge 201, the hardness of the protective sheet 202 is preferably higher. Therefore, in order to inhibit wear of the protective sheet 202 and the flexible cable 200, it is preferable that the hardness of the protective sheet 202 be as high as possible within a range equal to or less than the hardness of the flexible cable 200. Therefore, the material of the protective sheet 202 may be selected such that the hardness of the protective sheet 202 and the hardness of the flexible cable 200 are substantially the same. In this case, the material of the flexible cable 200 and the material of the protective sheet 202 may be the same. For example, a flexible cable that is not electrically connected to anything may be used as the protective sheet 202.

Also, in the present embodiment, the structure in which the flexible cable 200 comes into contact with the edge 201 when the first joint 22 flexes has been described as an example. Alternatively, even if the present invention has a structure in which the flexible cable comes into contact with the edge when the first joint 22 extends, the protective sheet can be provided between the edge and the flexible cable, thereby inhibiting wear and fatigue failure of the flexible cable during extension of the first joint 22.

Also, although the flexible cable 200 for the pressure sensors 70 passing through the first joint 22 has been described in the present embodiment, the protective sheet 202 is not limited thereto and can be used for a flexible cable 200 that passes through another place. That is, when the flexible cable 200 passes over an edge present at another location, the protective sheet is provided at that location, so that wear and fatigue failure of the flexible cable 200 can be inhibited.

For example, since the flexible cable 200 connected to the pressure sensors 70 is wired from the first finger link 211 to the pedestal 4, it also passes through an inside of the second joint 23. Therefore, also in the second joint 23, by providing the protective sheet 202 in the same manner, wear and fatigue failure of the flexible cable 200 can be inhibited.

Also, for example, the flexible cable may be used to supply power to the first motor 51 provided inside the second finger link 212. This flexible cable passes through the second joint 23. Accordingly, when there is an edge in the second joint 23, by providing the protective sheet 202 in the same manner as described above, wear and fatigue failure of the flexible cable can be inhibited.

Also, the protective sheet 202 can be similarly provided in the arm mechanism 3.

As described above, according to the present embodiment, by providing the protective sheet 202, wear and fatigue failure of the flexible cable 200 can be inhibited. Therefore, since a replacement cycle of the flexible cable 200 can be lengthened, maintenance work can be reduced.

REFERENCE SIGNS LIST

1 Robot arm
2 Hand mechanism
21 Finger
200 Flexible cable
201 Edge
202 Protective sheet

The invention claimed is:

1. A hand mechanism which has a plurality of fingers and grips an object with the fingers, comprising:
   a flexible cable;
   a joint which flexes or extends with the grip of the object, has a path for the flexible cable, and has a first surface and a second surface that is a surface bending from the first surface at a bending portion in the path; and
   a sheet which is provided between the first surface and the flexible cable to have flexibility and is formed such that a gap is provided between the second surface and the sheet, and is fixed to the flexible cable,
   wherein the sheet is fixed to the first surface and protrudes from the bending portion in a surface direction of the first surface to form the gap between the second surface and the sheet.

2. The hand mechanism according to claim 1, wherein a hardness of the sheet is set to be equal to or less than a hardness of the flexible cable.

3. The hand mechanism according to claim 2, wherein the hardness of the sheet is set to be the same as the hardness of the flexible cable.

4. The hand mechanism according to claim 1, wherein the sheet is formed using the same material as the flexible cable.

* * * * *